United States Patent [19]

Sakakibara et al.

[11] Patent Number: 5,094,652
[45] Date of Patent: Mar. 10, 1992

[54] BELT DRIVEN CONTINUOUSLY VARIABLE TRANSMISSION

[75] Inventors: Shiro Sakakibara, Toyokawa; Masahiro Hasebe, Anjo; Masashi Hattori, Anjo; Shigekazu Ohara, Anjo, all of Japan

[73] Assignee: Aisin Aw Co., Ltd., Japan

[21] Appl. No.: 343,284

[22] PCT Filed: Aug. 27, 1988

[86] PCT No.: PCT/JP88/00857
§ 371 Date: Jan. 5, 1990
§ 102(e) Date: Jan. 5, 1990

[87] PCT Pub. No.: WO89/02044
PCT Pub. Date: Mar. 9, 1989

[30] Foreign Application Priority Data

Aug. 28, 1987 [JP] Japan .................. 62-214379

[51] Int. Cl.⁵ ........................................ F16H 55/00
[52] U.S. Cl. ............................... 474/8; 474/46
[58] Field of Search ............... 474/8, 11, 12, 17, 18, 474/25, 27, 28, 46, 69, 70

[56] References Cited

U.S. PATENT DOCUMENTS

| | | | |
|---|---|---|---|
| 3,722,308 | 3/1973 | Steuer | 474/46 X |
| 4,016,771 | 4/1977 | Berens et al. | 474/46 X |
| 4,919,643 | 4/1990 | Fuss et al. | 474/46 |

Primary Examiner—Thuy M. Bui
Attorney, Agent, or Firm—Lorusso & Loud

[57] ABSTRACT

This invention relates to a belt driven continuously variable transmission having a pressure regulating cam mechanism giving an axial force corresponding to the transmission torque to a pulley and preventing too much belt pressing force. A retainer is fixed on a boss section of a stationary sheave and a spring made of multiple disc springs is situated on the outer surface of a boss section of a movable sheave for contact the retainer. A spring apparatus is composed of the retainer and the spring. Accordingly, at the decelerating range with large shifting ratio, besides the axial force made by the pressure regulating cam mechanism, the spring apparatus generates pressing force by contacting the retainer and maintains the belt holding force. When the shifting ratio is small, the spring returns to its natural length and disengages from the retainer.

6 Claims, 8 Drawing Sheets

PRIOR ART

BELT DRIVEN CONTINUOUSLY VARIABLE TRANSMISSION

BACKGROUND OF THE INVENTION

1. Field of the Invention

This invention relates to a belt driven continuously variable transmission and especially relates to a belt driven continuously variable transmission suitable for using in an automatic variable transmission to be mounted on an automobile more particularly, it relates to a pressure regulating mechanism section generating a axial force to correspond to a transmission torque.

2. Description of the Prior Art

Generally, this V-belt type continuously variable transmission (CVT) has a primary pulley and a second pulley each of which is made up of a movable sheave and a stationary sheave. Metallic belt is wound around both of these pulleys. A transmission shift done at a required moment by moving the movable sheave with a hydraulic piston.

Therefore, the continuously variable transmission, where a hydraulic pressure is used, needs an oil pump and a hydraulic pressure passage. This structure makes the device not only large and complicated but also unfavorable for the transmission efficiency and for the belt endurance because the structure requires the belt holding force more than needed, which furthermore, makes it impossible to transmit due to belt holding force becoming short in supply when the hydraulic pressure decreases some reason.

Figure 13:
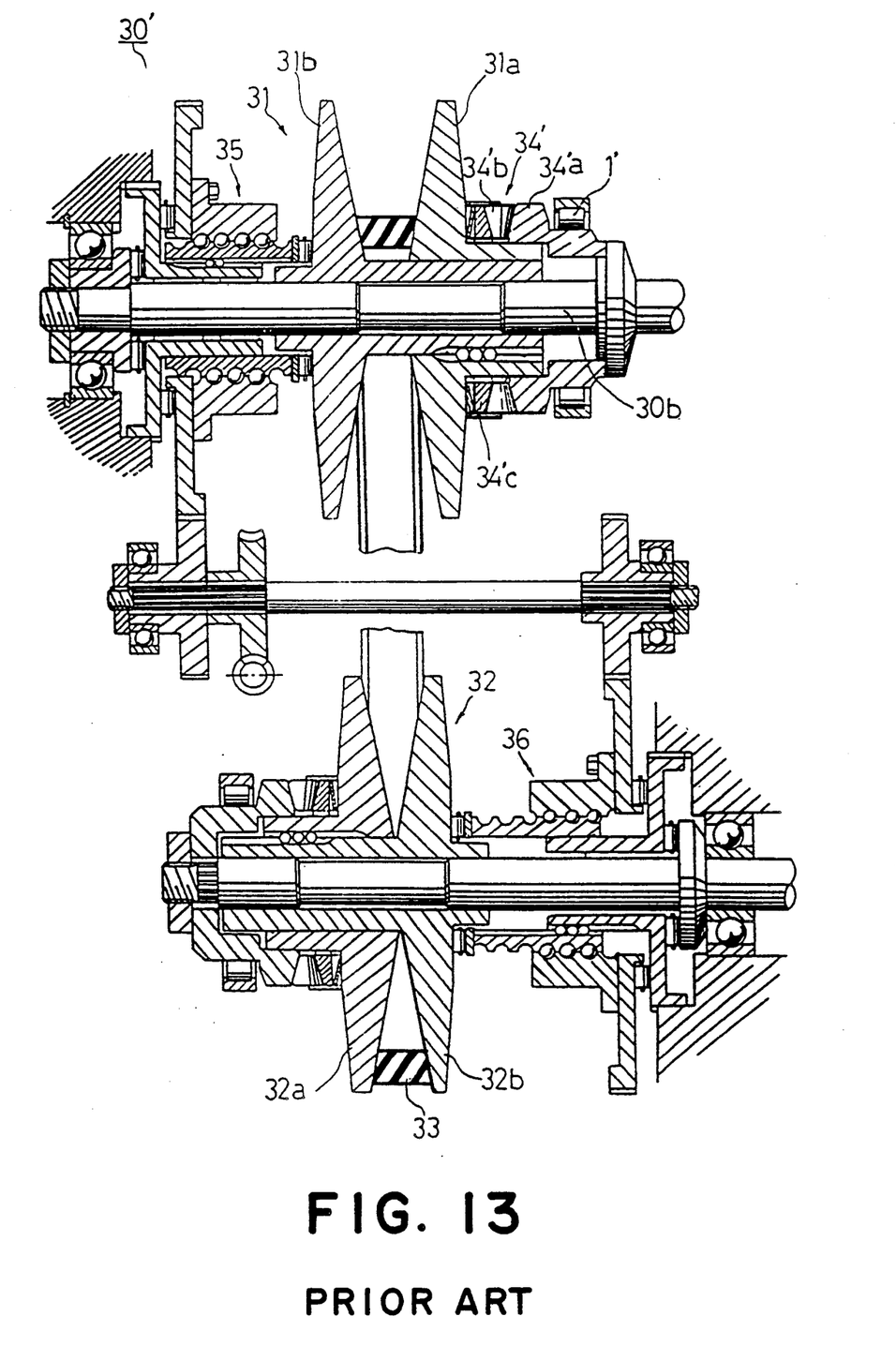
FIG. 13 is a cross sectional view of the prior art.

The applicant of the present invention has proposed that a belt driven continuously variable transmission 30', as shown in FIG. 13, having a metallic belt 33 around a primary pulley 31 and a secondary pulley 32, whose movable sheave 31b and 32b are moved axially by actuator mechanisms 35 and 36 such as ball thread mechanism, and to arrange a pressure regulating cam mechanism 34' imparting an axial force which corresponds to a transmission torque to a fixed sheave 31a. (refer to the Japanese Laid Open Patent No. 62-13853).

By the pressure regulating mechanism 34', this belt driven continuously variable transmission 30' gets the belt pushing force which is in proportion to the transmission torque, however, with reference to the shifting ratio only a constant belt holding force can be obtained.

While, in the continuously variable transmission the belt holding force varies by the shifting ratio, and when the shifting ratio gets small the required belt holding force gradually decreases even at the full opening of the throttle.

However, the continuously variable transmission 30' has the pressure regulating cam mechanism 34+ to generate a constant holding force according to the lowest speed shifting which requires the largest holding force. So at the lower speed shifting state of frequent use, a large belt holding force works. As result, a load much more than necessary works on the V-belt, the bearing and the pressure regulating cam mechanism, and causes decadance of transmission ratio, and maintenance and noise troubles.

This invention has as its purpose provision of a belt driven continuously variable transmission which is designed to have adequate belt holding force by varying axial force working on pulleys according to speed shifting ratio.

SUMMARY OF THE INVENTION

Figure 1:
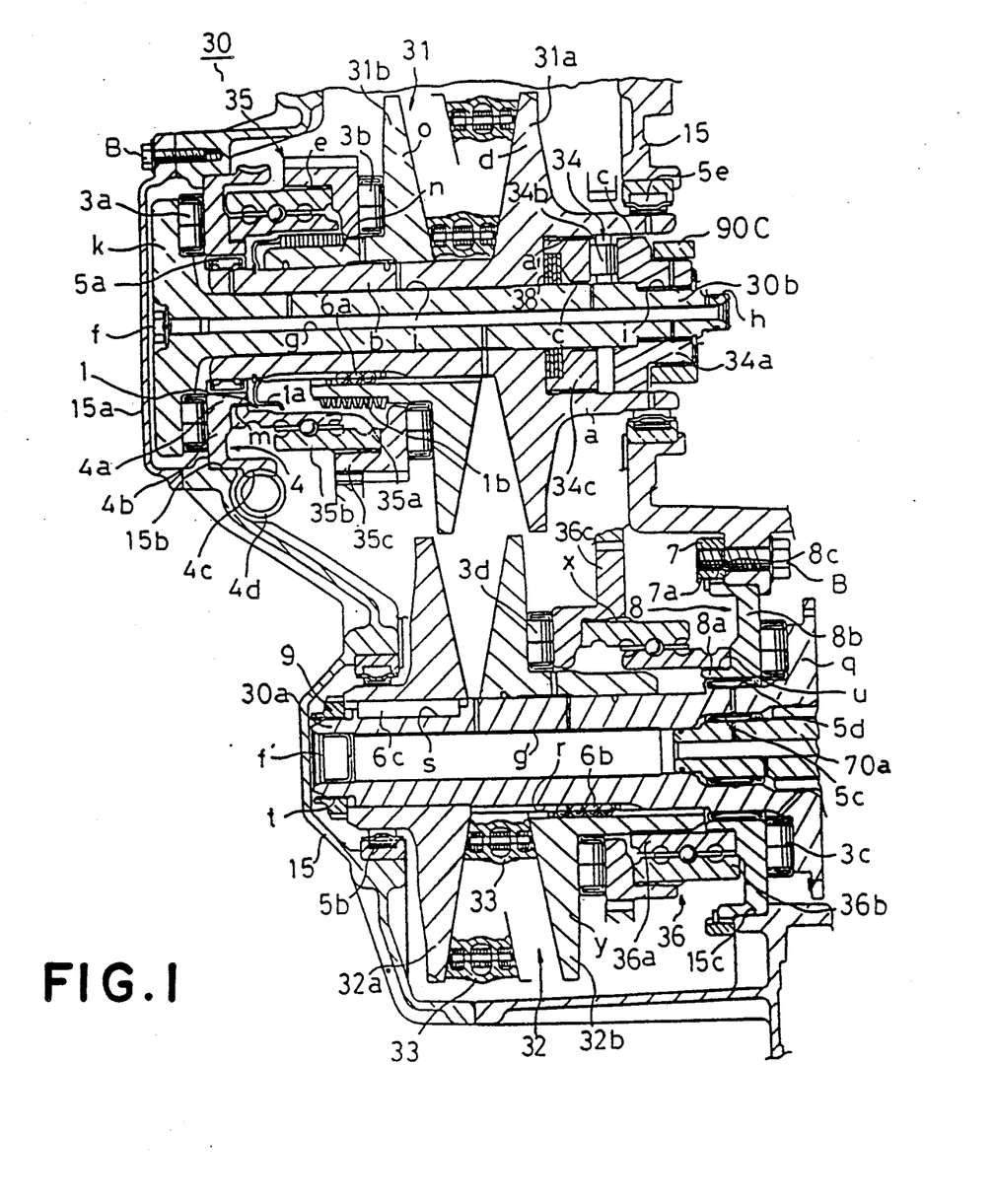
FIG. 1 is a cross sectional view of a belt driven continuously variable transmission relating to this invention.

This invention includes, as shown in FIG. 1 for example, a belt driven continuously variable transmission (30) with a primary pulley (31) and a secondary pulley (32) both of which are supported respectively by a shaft (30b) and (30a) both of which are composed of two sheaves (31a), (31b), (32a) and (32b) all relatively movable in the axial direction and a belt (33) which is wound around the pulleys (31) and (32). This belt driven continuously variable transmission (30) also has a pressure regulating mechanism (34) such as a cam mechanism giving a axial force corresponding to the transmission torque to both or either of the pulleys (31) and (32) and also has actuator mechanisms (35) and (36) such as a ball thread mechanism to move movable sheaves (31b) and (32b) axially.

This invention adopts a spring means (1) which works on at least one pulley (31), and which reduces pressing force according to decrease of shift ratio.

With the above structure, the rotation of the input member (90C) is transmitted to the fixed side race (34a) of the pressure regulating mechanism (34) and the fixed sheave (31a) of the primary pulley (31) through the pressure regulating mechanism (34). By this, an axial force corresponding to the transmission torque works on the sheave (31a). Furthermore, the torque transmitted to the primary pulley (31) is transmitted through the belt (33) to the secondary pulley (32) and then to the secondary shaft (30a). Both pulleys (31) and (32), whose effective diameters are adjusted at the required moment by the actuator mechanisms (35) and (36), are shifted steplessly and variably. At the decelerating condition U/D (underdrive), for example, (refer to the upper part of the FIG. 1) the spring means (1) gives a pressing force as to hold the belt (33) to the fixed sheave (31a) and the movable sheave (31b). This belt holding force becomes largest at the lowest shifting condition; the spring means (1) returns to the original length as the shifting ratio becomes small. The belt holding force is supported by not only the pressure regulating mechanism (34) but also spring means (1), so that the axial force generated by the pressure regulating mechanism (34) is decreased.

This invention, as has been explained up to now, arranges the spring means (1) and (1)' whose pressing force decrease as the shifting ratio decreases. The spring means (1), (1') secures necessary axial force together with the axial force generated by the pressure regulated mechanism (34), so that the pressure regulating mechanism (34) can be made to generate smaller axial force. Therefore, at all the ranges of the shifting ratio, especially smaller shifting ratio of the most frequent use, the belt holding force decreases so that the load of the thrust bearings (3a) and (3b) which support the axial force of the pulley (31) decreases. Because the pressure regulating mechanism (34) which generates small axial force can be used, improvements are achieved in the maintenance of the belt driven continuously variable transmission and of the belt itself by decreasing the belt holding force working on the belt (33). Also the transmission efficiency of the continuously variable transmission is improved. Furthermore, noises emitted by the belt on the pulley (31) can be reduced so that the reliability of the belt driven continuously variable transmission (30) can be improved.

As the spring means (1), if the disc spring (1b) working only at larger shifting ratio is employed, simple as the structure is, the spring means can work usefully at the decelerating range which needs a large belt holding force.

If the spring means is a combination of plural springs which have different pressing forces and natural lengths such as the disc spring (1'b) and the coil spring (1c), the belt pressing force varies according to the shifting ratio, and the degrees of freedom for the design on necessary belt pressing force can be increased.

Incidentally, the reference numerals in the parentheses are used only for reference to the drawings and do not define the invention. The same number may be used differently in the following description than in the previous description in which broader concepts are adopted.

DETAILED DESCRIPTION OF THE PREFERRED EMBODIMENT

A detailed description of the preferred embodiments shall now be shown.

Figure 2:
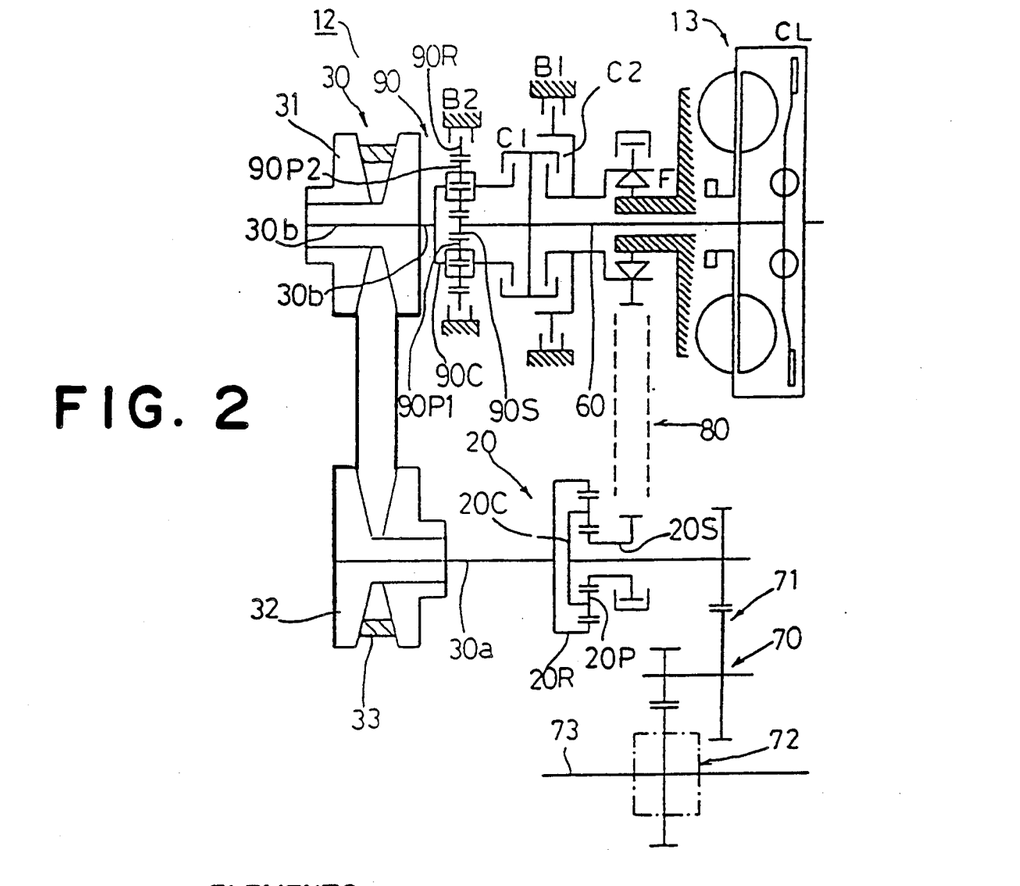
FIG. 2 is a schematic representation of a continuously variable transmission where this invention is applicable.

This automatic continuously variable transmission 12, as shown in Fig. has a single planetary gear device 20, a belt driven continuously variable transmisson 30, a transfer device 80, an input shaft 60, an output member 70 composed of a reduction gear device 71 and a differential device 72, a fluid coupling 13 having a lock-up clutch CL and a forward/reverse switching device 90 composed of a dual planetary gear device. And in the single planetary gear device 20, an element 20S (or 20R) to be a reaction force supporting member when using the single planetary gear device 20 as a reduction mechanism moves together with a restraining means F and B1 through a transfer device 80, and connects or disconnects with the input shaft 60 through a high clutch C2.

To put it concretely, the ring gear 20R of the planetary gear device 20 moves together with a secondary shaft 30a of the continuously transmission 30, a carrier 20C moves together with the output member 70, and the sun gear 20S moves together with a low one-way clutch F and a low coast & reverse brake B1 composing a restraining means through the transfer device 80 and also moves together with the high clutch C2.

In the dual planetary gear device 90, a sun gear 90S connects to the input shaft 60, a carrier 90c connects to both the primary shaft 30b of the continuously variable transmission 30 and the input shaft 60 through the forward clutch C1 and the ring gear 90R connects to the reverse brake B2.

Figure 3:
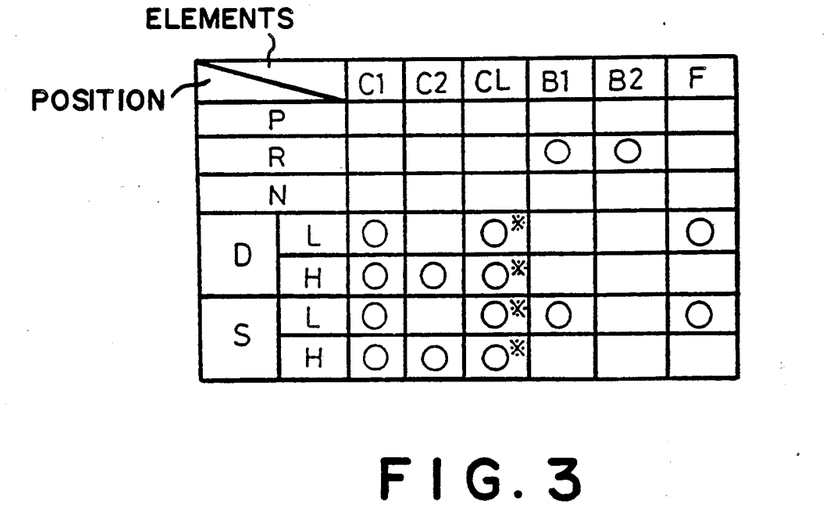
FIG. 3 is a table of operation of each element.

Based on the above structure, each clutch, brake and one-way clutch in the automatic continuously variable transmission 12 operate rate as shown in FIG. 3. ※ shows that the lock-up clutch CL can move at a required moment.

In detail, at the low speed side L of D range, the forward clutch C1 connects and the low one-way clutch F operates. At this stage, the rotation of the engine crank shaft is transmitted to the input shaft 60 through the lock-up clutch CL or the fluid coupling 13, to the sun gear 90S of the dual planetary gear device 90 directly and to the carrier 90C through the forward clutch C1. Therefore, the dual planetary gear mechanism 90 rotates together with the input shaft 60 and transmits the positive rotation to the primary shaft 30b of the belt driven continuously variable transmission 30. Furthermore, the rotation shifted at a required moment at the continuously variable transmission 30 is transmitted from the secondary shaft 30a to the ring gear 20R of the single planetary gear device 20. While, at this state, the sun gear 20S which is the reaction force supporting element to receive the reaction force is stopped by the low one-way clutch F through the transfer device 80. So the rotation of the ring gear 20R is taken out from the carrier 20C as a reduced rotation and transmitted to the axle 73 through the reduction gear device 71 and the differential device 72.

At the high speed side H of D range, not only the forward clutch C1 but also the high clutch C2 connects. At this state, the positive rotation shifted at a required moment at the continuously variable transmission is taken out from the secondary shaft 30a and input into the ring gear 20R of the single planetary gear. While, at the same time, the rotation of the input shaft 60 is transmitted to the sun gear 20S of the single planetary gear device through the high clutch C2 and the transfer device 80. By this process, torque of the ring gear 20R and the sun gear 20S is combined and taken out from the carrier 20C. At this state, as the rotation against the reaction force through the transfer device 80 is transmitted to the sun gear 20S, the torque circulation does not occur and the certain positive torque is transmitted through the transfer device 80. The combined torque from the carrier 20C is transmitted to the axle shaft 73 through the reduction gear device 71 and the differential device 72.

At the operation of D range, the rotation is free at the reverse torque operation (at the engine brake) based on the one-way clutch F, while at the operation of S range, besides the low one-way clutch F, the low coast & reverse brake B1 operates and power can be transmitted even at the reverse operation.

At the R range the reverse brake B2 operates together with the low coast & reverse brake B1. At this state, the rotation of the input shaft 60 is input to the belt driven continuously variable transmission 30 as a reverse rotation from the carrier 90C as the ring gear 90R of the dual planetary gear device 90 is stopped. While, based on the operation of the low coast & reverse brake B1, the sun gear 20S of the single planetary gear device 20 is stopped so that the reverse rotation of the automatic continuously variable transmission 30 is decelerated at the planetary gear device 20 and taken out to the output member 70.

And at P range and N range, the low coast & reverse brake B1 operate.

Figure 4:
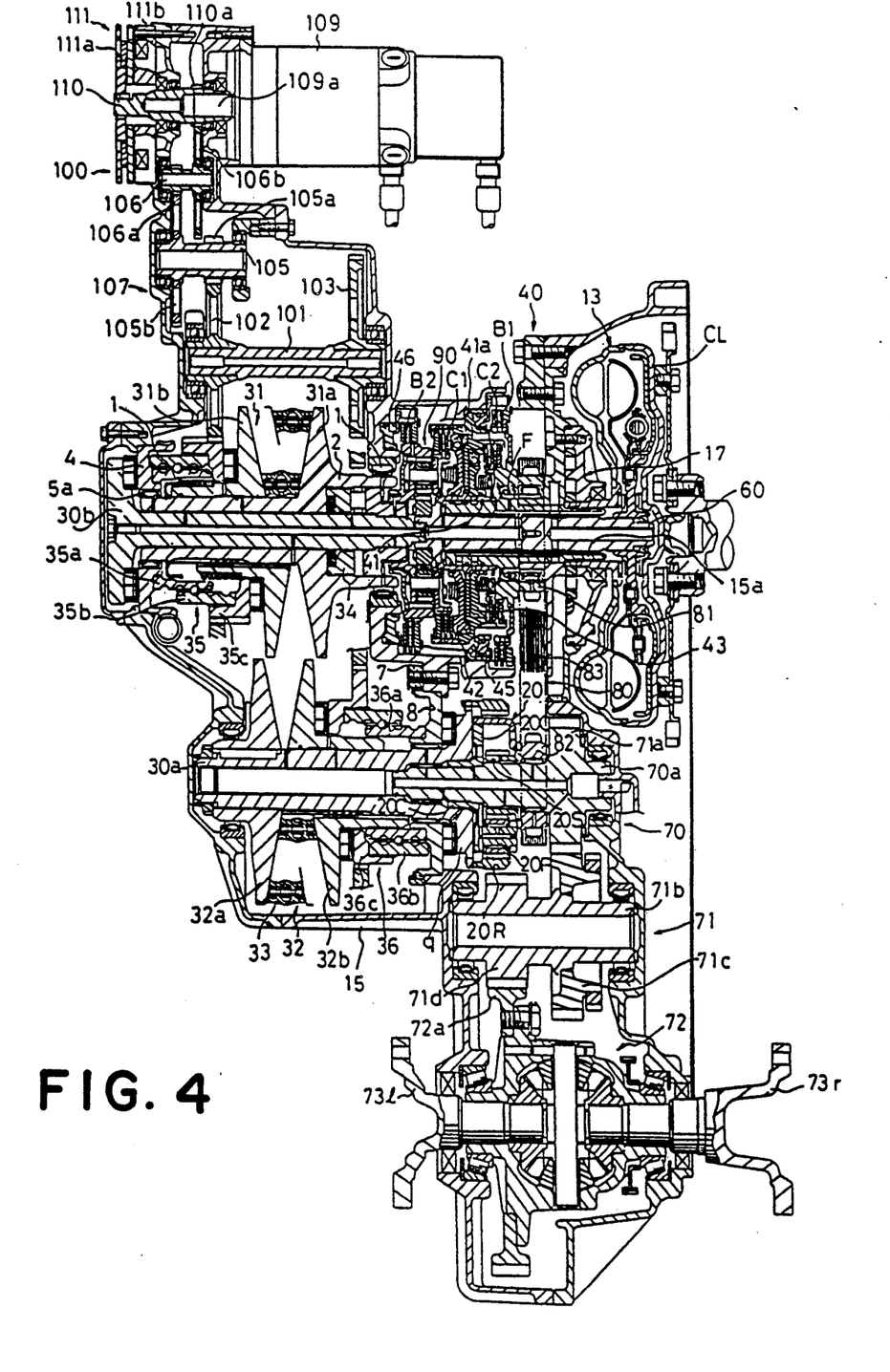
FIG. 4 is a cross sectional view of the continuously variable transmission.

The embodiment of the automatic continuously variable transmission realized will be shown along with FIG. 4.

This continuously variable transmission 12 has the transmission case 15 where the input shaft 60 and the primary shaft 30b of the continuously variable transmission 30 are supported on the same (first) shaft with rotation free. The secondary shaft 30a of the continuously variable transmission device 30 and the gear axis 70a are supported on the same shaft with rotation free and compose a secondary shaft. Furthermore, on the primary shaft, are arranged, the fluid coupling 13 having the lock-up clutch CL, the forward clutch C1, the high clutch C2, the low coast & reverse brake B1, the reverse brake B2, a controlling section 40 consisting of a low one-way clutch F, the dual plane-tary gear device 90 composing the forward/reverse switching device and a hydraulic pressure pump 17. On the secondary shaft, the single planetary gear device 20 is arranged.

Furthermore, to explain the controlling section 40 and the input section, the input shaft 60 has one side edge which engages with the lock-up clutch CL and the output member of the fluid coupling 13 and another side edge which engages with the sun gear 90S of the dual planetary gear device 90. On the input shaft 60 a sleeve section 15a which is fixed on the case 15 is arranged. To the sleeve section 15a, a sprocket 81 is connected through the one-way clutch F, while a sleeve shaft 41 connecting to the input shaft 60 is supported with rotation free. Furthermore, at one side of a flange section 41a extending from the sleeve shaft 41, the forward clutch C1 is arranged together with a hydraulic pressure actuator 42, and at the other side, the high clutch C2 is arranged together with a hydraulic pressure actuator 43. The operated side of the high clutch C2 is connected to the boss section which is connected to the low coast & reverse brake B1 arranged together with a hydraulic actuator 45 in the case 15. The operated side of the forward clutch C1 is connected to the carrier 90C of the dual planetary gear device 90 whose ring gear 90R engages with the reverse brake B2 arranged in the case 15 together with a hydraulic actuator 46 (reference to FIG. 2). Here, the carrier 90C supports pinions 90P1 and 90P2, both pinions mesh each other, the pinion 90P1 meshes with the sun gear 90S, the pinion 90P2 meshes with the ring gear 90R.

The single planetary gear device 20, whose ring gear 20R connects to the flange section 'q' on the secondary shaft 30a of the belt driven continuously variable transmission 30 to be mentioned later on, is arranged on the gear shaft (output shaft) 70a also composing the secondary shaft. On the gear shaft 70a, a sprocket 82 is supported rotation free together with the sun gear 20S. On the gear shaft 70a, the carrier 20C supporting the pinion 20P is spline-coupled.

While, between the sprocket 82 integral with the sun gear 20S and the sprocket 81 supported by the low one-way clutch F, a silent chain 83 is wound round and composes the transfer device 80 by these sprockets and the chain.

The gear shaft 70a composes the output member 70 integrally with a gear 71a, which engages with a gear 71c fixed on an intermediate shaft 71b. Furthermore, on the intermediate shaft 71b, a small gear 71d is formed.

The small gear 71d engages with a ring gear 72a fixed on the differential device 72 and composes the reduction device 71. The right/left front axle shaft 73l and 73r extend from the differential device 72.

The belt driven continuously variable transmission 30 of this invention, as shown in FIG. 1, is arranged with the primary pulley 31, them secondary pulley 32 and the belt 33 wound around both of these pulleys, which are made of stationary sheaves 31a, 32a and movable sheaves 31b, 32b.

The stationary sheave 31a of the primary pulley 31 covers the primary shaft 30b and has a long boss section 'b' elongated to the side of the movable sheave 31b. A cylinder-shaped hub 'a' is integrally formed on the back surface of the flange section 'd'. The outer diameter surface of the hub 'a', whose inner side control pressure regulating cam mechanism 34 is supported by the case 15 with free rotation through a roller bearing 5e. The pressure regulating cam mechanism 34 is composed of a fixed race 34a and a movable race 34c, both of which have wave-shaped end surfaces and a roller 34b interposed between both wave-shaped ends. The fixed race 34a is spline-coupled with the edge of the primary shaft 30b and stopped by snap rings. The movable race 34c connects to a spline 'a₁' arranged on the inner surface of the hub section 'a' with axial direction movement free. Between the fixed race 34a and the inner surface of the hub section 'a' certain interval 'c' is arranged. Between the movable race 34c and the primary shaft 30b a certain interval 'c' is also arranged. Therefore between the fixed race 34a and the stationary sheave 31a, and, between the the movable race 34c and the shaft 30b, no torque is transmitted by frictional contact. On the outer diameter surface of the fixed race 34a, a spline is formed and the input member, or the carrier 90C of the dual planetary gear 90 is spline-coupled. The movable race 34c transmits the torque to the stationary sheave 31a through the spline $a_1$, and produces the axial force, which is in proportion to the transmitting torque, through many disc springs 38 which are arranged in the concave section and which produce the preload.

Figure 5:
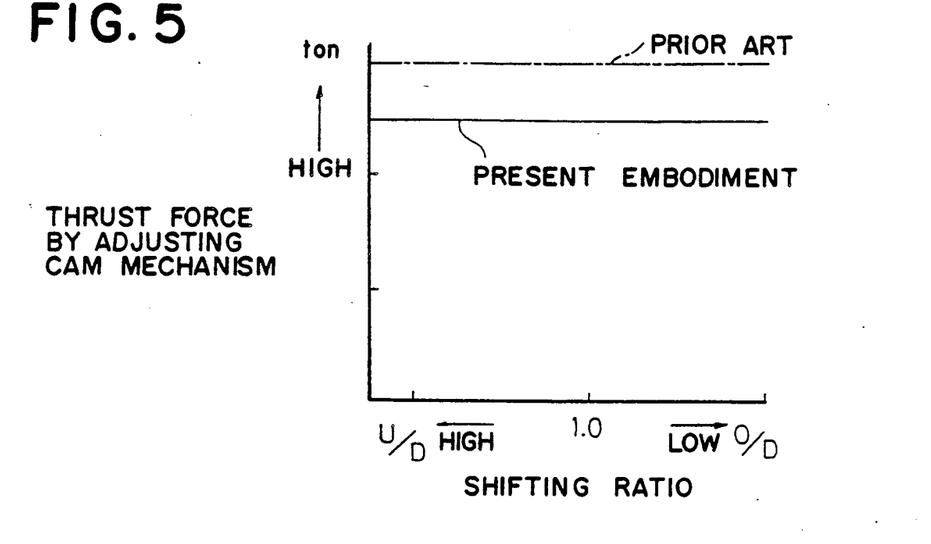
FIG. 5 is a graphical representation of the axial force of a pressure regulating cam mechanism vs. the shifting ratio.

The axial force based on the pressure regulating cam mechanism 34 as shown in FIG. 5, keeps a constant level regarding the shifting ratio. In this invention, the axial force (full line) is set lower by a certain amount than the prior art (chain line).

While, an oil passage 'g' whose end is pluged by a cap 'f' runs through right in the middle of the primary shaft 30b where many side holes supplying lubricating oil to required places are formed. The base end portion, or the dual planetary gear device 90 side forms an "in-low" section 'h' engaging with the input shaft 60. The outer diameter surface of the base end forms a screw section 'i' and the section which engages with the boss section 'b' of the stationary sheave 31a is an oil groove 'j'. The end of the shaft 30b, which is opposite the gear device 90, enlarges to form integrally a large diameter flange section 'k', whose inner surface forms a seat for the thrust bearing 3a. While the 15 a cap 15a is fixed by a bolt B covering the large diameter flange 'k'. The shoulder section 15b of the case 15 supports the regulating retainer 4.

The regulating retainer 4 is made of circular members having channel shape cross section. An inner diameter brim section 4a supports the stationary sheave 31a with rotation free by the inner surface of the brim 4a through the radial roller bearing 5a. A spline 'm' is formed on the outer surface of the regulating retainer 4. The thrust bearing 3a is supported by the outside wall section 4b. A worm wheel 4c is formed on the outer brim section of the outside wall section 4b. This worm wheel 4c meshes with a worm 4d, and by rotating the worm 4d, the regulating retainer 4 is rotated at the axially unvariable position in contact with the bearing 3a.

Between the boss section 'b' of the stationary sheave 31a and the boss section 'n' of the movable sheave 31b, a spring means 1 is arranged. The spring means 1 is composed of a retainer 1a fixed on the boss section 'b' of the stationary sheave 31a by a snap ring and a multiple disc spring 1b arranged between the shoulder and the snap ring both of which are on the outer surface of the boss section 'n' of the movable sheave 31b. When the effective diameter of the pulley 31 is small, or at the decelarating condition (reference to the upper part of FIG. 1), the retainer 1a contacts with the disc spring 1b to give the pulley an axial force to hold the belt. This axial force decreases as the effective diameter, of the pulley 31 gets larger to allow the disc spring 1b to extend back to the natural length. And when the pulley 31 be-comes larger than a certain value (reference to the lower part of FIG. 1), the retainer 1a and the disc spring 1b disengage and do not provide an axial force.

While, at the movable sheave 31b the boss section 'n' is supported by the boss section 'b' of the stationary sheave 31a with only slide movement free through the ball spline 6a, and a ball thread device 35 is arranged on the back section of the flange section 'o'. The ball thread device 35 is made of a bolt section 35a and a nut section 35b. On the inner surface of the bolt section 35a, a groove engaging with the spline 'm' of the regulating retainer 4 is formed. On the outer surface of the nut section 35b a spline 'e' is formed. A circular gear section 35c whose circumferential section is formed into a wide circular gear is spline-coupled to the spline 'e'. Between the gear section 35c and the flange section 'o' of the movable sheave 31b, a thrust bearing 3b is interposed. Therefore, a bolt section 35a of a ball thread device 35 is connected without rotation to the case 15 through the regulating retainer 4 and is connected to the primary shaft 30b through the thrust bearing 3a without axial movement. The nut section 35b of the ball thread device 35 is connected to the movable sheave 31b through the thrust bearing 3b so that the nut section 35b and the sheave 31b move together.

The secondary pulley 32 has a fixed sheave 32a and a movable sheave 32b. The fixed sheave 32a is supported by a roller bearing 5b in the case 15 with rotation free and connected to a secondary shaft 30b without rotation through a key 6c. The movable sheave 32b is supported, with only sliding movement allowed, on the secondary shaft 30a through a ball spline 6b.

The oil passage g' run through the middle of the secondary shaft 30a and has the end pluged by a cap f'. Many side holes to supply lubricating oil to required places are also formed in the secondary shaft 30a, whose base end, or the side of the single planetary gear device 20, enlarges to be a large diameter flange section 'q'. The diameter of the oil passage hole g' becomes stair-shapedly large, corresponding to the flange section 'q'. The section 'q' is mounted on the output shaft 70a through a needle bearing 5c. On the outer diameter of the shaft 30a, starting from the flange section 'q', a ball groove 'r', a key groove 's' and a screw 't' are formed in this order and each of them supports the movable sheave 32b and the stationary sheave 32a. A nut member 9 is screwed to the screw 't'.

A regulating ring 7 is fixed by a bolt B on the approximately same plane with the needle bearing 5c of the case 15. Furthermore, a regulating retainer 8 is supported by a shoulder section formed in the case 15. The regulating retainer 8 whose cross section is channel shape, whose inner diameter brim section 8a supports the secondary shaft 30a with rotation free through the roller bearing 5d, and whose outer surface forms a spline 'u', is a circular shaped member. Furthermore, between the outside of a side wall section 8b and the flange 'q', the thrust bearing 3c is held and a gear 8c selectively engaging with a gear 7a of the ring 7 is formed.

Furthermore, on the back side of a flange section 'y' of the movable sheave 32b a ball thread device 36 which is composed of a bolt section 36a and a nut section 36b is arranged. A groove mating with a spline 'u' of the regulating retainer 8 is formed on the inner surface of the bolt section 36a. The, nut section 36b has a spline 'x' formed on its outer surface, which is a non-circular gear sections 36c is spline-coupled. Between the gear section 36c and the flange section 'y' a thrust bearing 3d is interposed. So the bolt section 36a of the ball thread device 36 is connected to the case 15 without rotation and to the flange section 'q' of the secondary shaft 30a with no axial movement allowed through the thrust bearing 3c. The nut section 36b is connected to the movable sheave 32b, through the thrust bearing 3d, to axially move with the movable sheave 32b.

A shifting device 100 regulating the distance between the primary pulley 31 and the secondary pulley 32 is placed between two pulleys 31 and 32 so that each pulley and the device 100 form the apexes of triangle. The shifting device 100, as shown in FIG. 4, has an operating shaft 101 supported by the case 15 with rotation free. As FIG. 4 is a development, the operating shaft 101 is drawn at the upper part, however, practically, the operating shaft 101 is placed between the primary shaft 30b and the secondary shaft 30a by an elevation. At the operating shaft 101, a circular gear 102 and a non-circular gear 103 are fixed. The non-circular gear 102 engages with the non-circular gear 35c fixed to the nut section 35b at the side of the primary pulley 31. The non-circular gear 103 engages with the non-circular gear fixed to the nut section 36b at the side of the secondary pulley 32. The circular gear 103 with the small gear 105a made as a spur gear or helical gear engaged at the reverse side of the circular gear 35c. A large gear 105b engaging with a small gear 106a which is formed on an intermediate shaft 106 is fixed on an intermediate shaft 105. These gears compose a reduction device 107 with high transmission efficiency. A comparatively small electric motor (or a supersonic motor) 109 is arranged with its one side fixing to in the case 15. On an output shaft 109a of the motor 109, a shaft 110 having a small gear 110a which engages the large gear 106b arranged on the intermediate shaft 106 is fixed. A brake disc 111a is fixed on the shaft 110. An electromagnetic coil member 111b is fixed by a bolt to the case 15. The electromagnetic coil member 111b and the brake disc 111a compose an electromagnetic brake 111 which restrains the operating shaft 101. As the supersonic motor has a restraining mechanism inside, when it is being used, no special restraining mechanism, such as the electromagnetic brake, is needed.

An assembly of the belt driven continuously variable transmission 30 shall be explained in detail.

At the primary side, the thrust bearing 3a is arranged on the primary shaft 30b and a stationary sheave 31a, the movable sheave 31b, the spring means 1, the thrust bearing 3b and an assembly the ball thread device 35 and the regulating retainer 4 are arranged on the shaft 30b; these are assembled in this order from the screw 'i' side. Then a disc spring 38, the movable race 34c and the roller 34b are enclosed in the hub section 'a' and the fixed race 34a is screwed and stopped, which completes the whole assembly. On the other hand, at the secondary side, are the thrust bearing 3c, the regulating retainer 8, the ball thread device 36, the movable sheave 32b and the stationary sheave 32a; these are assembled in this order from the screw 't' side, thus the whole assembly is completed.

In the sub assembly at the primary side, composed as the above explanation, the belt 33 is held between both the sheaves 31a, 31b and the hub section 2 of the stationary sheave 32a is inserted into the roller bearing 5e and the regulating retainer 4 is inserted into the shoulder 15b of the case 15 which is separable into two parts. At a sub assembly on the secondary side, regulating retainer 8 is interposed in the shoulder of the case 15, boss section of the movable sheave 32b is interposed in the roller beraing 5b.

At this state, by the tolerances among each member the inital belt tension is not correct and the stroke at the reversal of transmission torque of the regulating cam mechanism 34 is large. Therefore at the secondary side, the regulating retainer 8 is rotated at the required moment, the bolt section 36a integral with the retainer 8 is relatively rotated against the nut section 36b and the spacing within the pulley 32 is regulated. Then, the gear 7a of the regulating ring 7 is meshed with the gear 8c of the retainer 8 and the ring 7 is fixed by the bolt B. While, at the primary side, a worm 4d is rotated to rotate the regulating retainer 4. The bolt section 35a is integral with the retainer 4. Though the bolt section 35a rotates integral with the retainer 4, as the bolt section 35a is axially positioned by the thrust bearing 3a, the nut section 35b moves axially to regulate the spacing within the pulley 31 correctly. By this process, the initial belt tension is regulated to make the stroke of the pressure regulating cam mechanism 34 correct and the position of both pulleys 31 and 32, or the belt driving line is regulated to be correct.

If the worm 4d is operated from outside the case 15, regulation can be done even after the case is assembled. And the worm 4d can be situated at the secondary side or at both the secondary side and the primary side. The regulating retainer can be situated at either the primary or the secondary side.

The operation of this embodiment shall be explained below.

The rotation of the engine crank shaft is transmitted to the input shaft 60 through the lock-up clutch CL or the fluid coupling 13 and then transmitted to the sun gear 90S of the dual planetary gear device 90 and to the sleeve shaft 41. At the D range and the S range, the forward clutch C1 connects and the reverse brake B2 releases, so that in the dual planetary gear device 90 the sun gear 90S and the carrier 90C rotate together and the positive rotation is transmitted from the carrier 90C to the fixed race 34a of the pressure regulating cam mechanism 34 of the belt driven continuously variable transmission 30.

The rotation of the fixed race 34a rotates the primary shaft 30b engaging with the thread 'i' and also rotates the stationary sheave 31a of the primary pulley 31 through the roller 34b arranged on the wave-shaped surface, the movable race 34c and the spline 2a and furthermore rotates the movable sheave 31b through the ball spline 6a. Both ends of the stationary sheave 31a are supported by the case 15 through the bearings 5e and 5a. As spacing 'c' is provided between the fixed race 34a and the hub section 'a' and also between the movable race 34c and the primary shaft 30b, the torque is not transmitted from the fixed race 34a and from the primary shaft 30b to the stationary sheave 31a by friction. The whole torque transmitted from the carrier (the input member) 90C is transmitted to the stationary sheave 31a through the pressure regulating cam mechanism 34. And at the pressure regulating cam mechanism 34, the axial force corresponding to the input torque which works on the fixed race 34a works on the back surface of the sheave 31a through the disc spring 38. Regarding the sheave 31b, the ball thread device 35 where the nut section 35b is connected to the sheave 31b is axially fixed to correspond to the shifting ratio, therefore the same strength of reaction force works on the back surface of the sheave 31b through the thrust bearing 3b. Accordingly the primary pulley 31 holds the belt 33 by the holding force corresponding to the input torque. The axial force working on the movable sheave 31b works on the flange section 'k' of the primary shaft 30b through the thrust bearing 3b, the ball thread device 35, the regulating retainer 4 and the thrust bearing 3a. The axial force working on the stationary sheave 31a works from the fixed race 34a to the shaft 30b through the thread 'i'. Therefore the axial force is kept in the shaft 30b as tension force. Furthermore the rotation of the belt 33 is transmitted to the secondary pulley 32, and to the secondary shaft 30a through the key 6c and the ball spline 6b.

At the belt transmission, the motor 109 is controlled based on the signals from each sensor such as the opening ratio of the throttle and the vehicle speed, etc. The operating shaft 101 is rotated through the reduction device 107. Then the nut section 35b at the side of the primary pulley 31 is rotated through the circular gears 102 and 35c. The nut section 36b at the side of the secondary pulley 32 is rotated through the non-circular gears 103 and 36c. By this process, the nut sections 35b and 36b rotate relatively between the bolt section 35a and 36a whose rotations are stopped by the case 15 at the regulating retainer 4 and 8. The ball thread devices 35 and 36 move the movable sheaves 31b and 32b through the thrust bearings 3b and 3d, and the primary pulley 31 and the secondary pulley 32 are set to the effective diameter for the predetermined torque ratio. The electric current is cut when the torque ratio reaches the predetermined level, and the electromagnetic brake 111 starts operating and keeps both the pulleys 31 and 32 at the same torque ratio. At this state, both the ball thread devices 35 and 36 linearly move. Therefore a difference arises between the original traveling distance of the movable sheave by the belt 33 and the traveling distance of the ball thread devices, however, the secondary pulley 32 side rotates through non-circular gears 103 and 36c, the movable sheave is moved by the compensated traveling distance according to the movable sheave.

Figure 6:
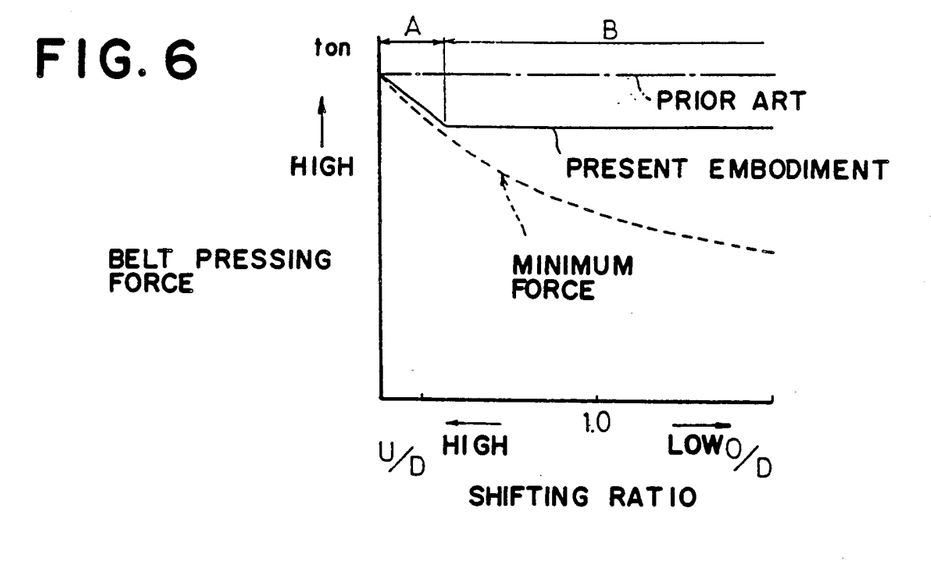
FIG. 6 is a graphical representation of the belt pressing force vs. the shifting ratio.
Figure 7:
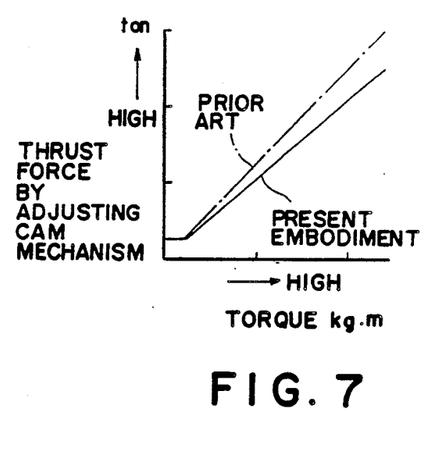
FIG. 7 and FIG. 8 are graphical representations of the axial force of a pressure regulating cam mechanism vs. torque.
Figure 8:
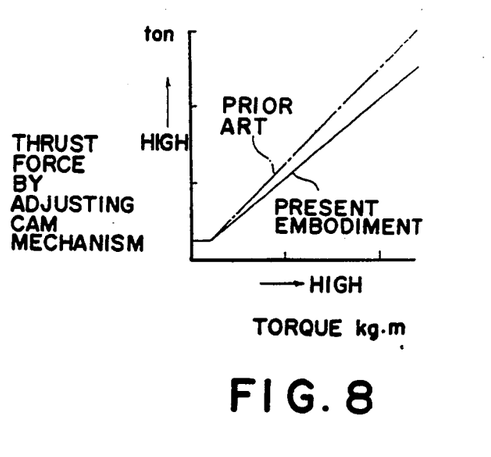
Figure 9:
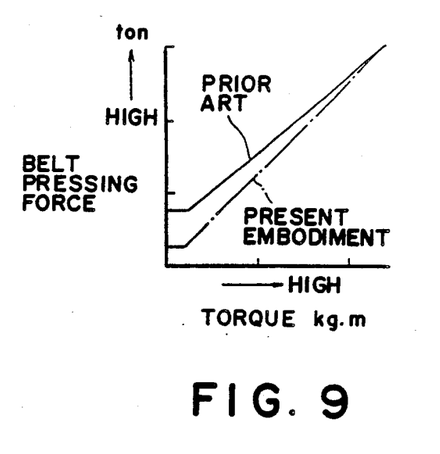
FIG. 9 and FIG. 10 are graphical representations of the belt pressing force vs. torque.
Figure 10:
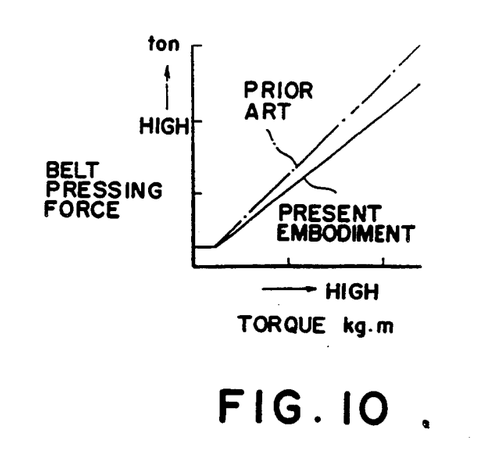

In the case of the power transmission, as shown in FIG. 6, at the reduction range A of the belt driven continuously variable transmission 30, the disc spring 1b contacts the retainer 1a and the spline 1b touches the retainer 1a and the spring means 1 generates pressing force to the movable sheave 31b and the stationary sheave 31a in the direction of the belt pressing force. Besides the axial force based on the pressure regulating cam mechanism 34, a pressing force made by the spring means 1 works on the pulley 31. This pressing force is largest at the most decelerating condition, the more the effective diameter of the belt 33 becomes large, the more the pressing force gradually decreases. The disc spring 1b and the retainer at a certain shifting condition and the only axial force to work on the pulley is the one based on the pressure regulating cam mechanism 34 shown in FIG. 5 (B range). The, break line shown in FIG. 6 shows the minimum belt pressing force necessary at the full-opening of throttle, or the whole torque-working condition. Considering the partly-working torque condition, or the decrease of the axial force based on the pressure regulating cam mechanism 34, the belt pressing force increased over the force of the minimum necessary in B range. By this motion, in range A where large belt pressing force is required, the spring means 1 works, therefore the generated axial force based on the pressure regulating cam mechanism 34, even with its smaller measure compared to that of the conventional one, can be sufficient. Therefore, as shown in FIGS. 7 and 8, the generated axial force is lower than the conventional one, even when the force is in the decelerating range A or the other range B. However, based on the additional force by the spring means 1 the belt pressing force of this invention is higher than the prior embodiment as shown in FIG. 9 in the decelarating range A. And the difference of the belt pressing force between this invention and the prior embodiment becomes smaller as the transmitting torque becomes higher in the decelerating range A, as shown in FIG. 9, while the belt pressing force of the prior embodiment is larger than that of this invention and the difference becomes larger as the transmission torque becomes higher in the decelerating range B.

Furthermore, the rotation of the secondary shaft 30a of the belt driven continuously variable transmission 30 is transmitted to the ring gear 20R of the single planetary gear device 20 and also to the gear shaft 70a through the carrier 20C.

And at the low-speed side L of D range, as shown in FIG. 3, as the low one-way clutch F is in operating condition, the sun gear 20S receives the reaction force at the torque transmission from the ring gear 20R to the carrier 20C. The rotation of this sun gear 20S is stopped by the low one-way clutch F through a transfer device 80. The single planetary gear device 20 works as a reduction mechanism. Therefore, the rotation of the secondary shaft 30a of the belt driven continuously variable transmission 30 is merely decelerated at the single planetary gear device 20, then, through the reduction gear device 71 composed of a gear 71a, 71c, an intermediate shaft 71b, the gear 71d and the mount gear 72a, is transmitted to right and left front axle shafts 73l and 73r through the differential device 72.

When the throttle opening ratio and the vehicle speed reach certain levels, the high clutch C2 receives signals from the controlling unit in order to connect and get switched to the highspeed side. The rotation of the input shaft 60 is first transmitted to the belt driven continuously variable transmission 30, then through the sleeve shaft 41 and the high clutch C2 transmitted to the sprocket 81 and finally to the sun gear 20S of the single planetary gear device 20 through the silent chain 83 and the sprocket 82. In this process, as the sprocket 81 at the input side of the transfer device 80 receives the reaction force from the sun gear 20S of the single planetary gear device 20 by the low one-way clutch F, a shift-shock caused by the shifting is prevented, the rotation starts smoothly by the connection of the high clutch C2 and the torque is transmitted to the sun gear 20S. By this process, the torque steplessly shifted by the belt driven continuously variable transmission 30 and, the torque through transfer device 80 are combined at the single planetary gear device 20 and the combined torque is transmitted from the carrier 20C to the gear shaft 70a. Furthermore, as the same with the low-speed side, the combined torque is transmitted to the right and left front axle shafts 73l and 73r through the reduction gear device 71 and the differential device 72.

As the low-speed side L of S range receives a negative torque made by the engine brake and so on, the low-coast & reverse brake B1 engages and both the forward and the reverse rotations of the sprocket 81 are stopped. The condition of the high-speed side H at S range is as the same with that of the high-speed side of D range.

While, at the R range, the forward clutch C1 is released and the reverse brake B2 is engaged. Therefore, the rotation of the input shaft 60 transmitted to the sun gear 90S of the dual planetary gear device 90 is transmitted as a reverse rotation, due to the suspension of the ring gear 90R, from the carrier 90C to the primary shaft 30b of the belt driven continuously variable transmission 30. In this process, the reaction torque works on the sprocket 81 as the reverse rotation from the sun gear 20S of the single planetary gear device 20 through the transfer device 80. Therefore the low-coast & reverse brake B1 operates and the sprocket 81 is stopped.

Figure 11:
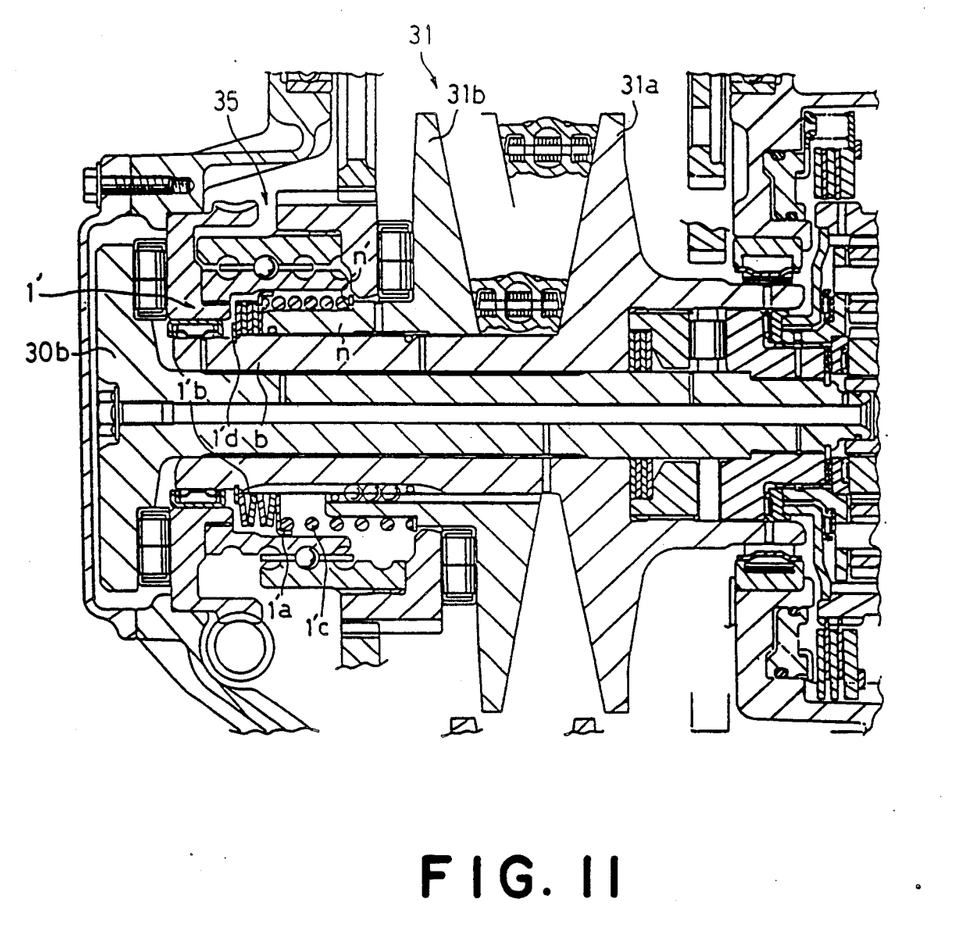
FIG. 11 is a cross sectional view of a primary pulley of an embodiment partly modified.

An embodiment partially modified will be explained along with FIGS. 11 and 12.

A spring means 1' of this embodiment has a coil spring 1'c in addition to multiple disc spring 1'b. The multiple disc spring 1'3b is screwed and stopped by a nap ring 1'd onto the outer surface of the boss section 'b' of the stationary sheave 31a. A coil spring 1'c is arranged in series between the disc spring 1'b and the shoulder n' of the movable sheave 31b through the retainer 1'a. And the coil spring 1'c is elastically weaker compared with the disc spring 1'b. Consequently, the following situations are possible to set: to make the coil spring 1'c natural length at the maximum effective diameter of the pulley 31 (refer to the lower part of FIG. 11); to put the coil spring 1'c under a certain pressing condition; to make the coil spring 1'c under a certain distance toward the retainer 1'a.

Figure 12:
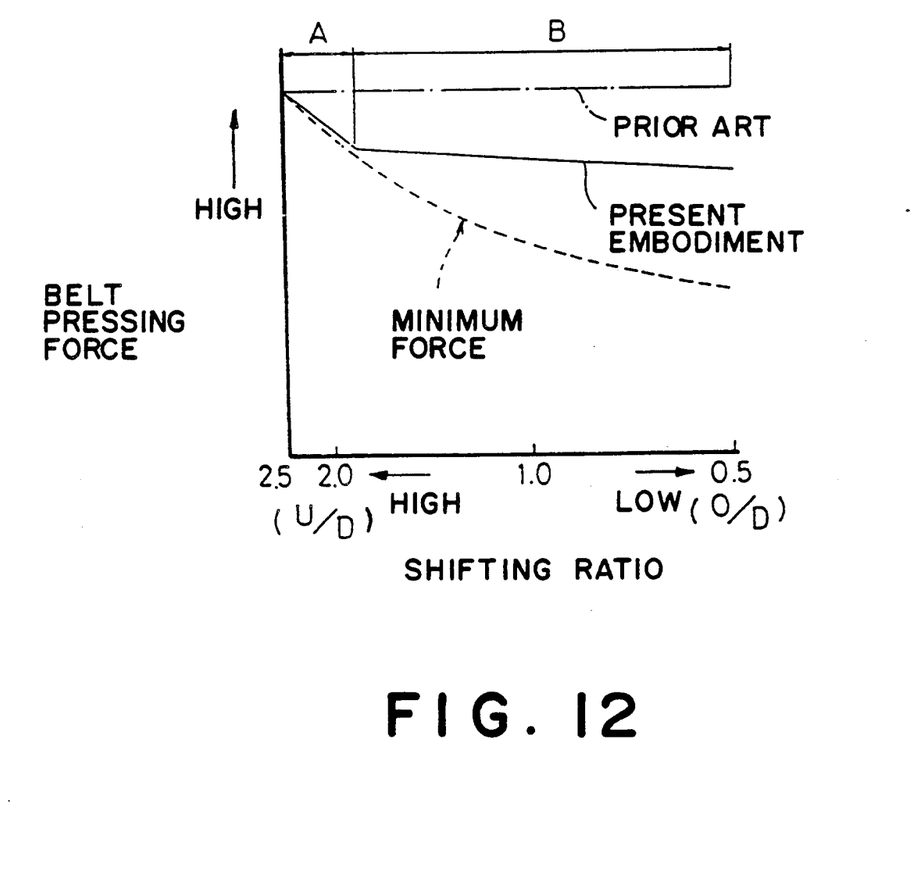
FIG. 12 is a graphical representation of a belt pressing force vs. ratio.

Therefore, in this embodiment, as shown in FIG. 12, with regard to the belt pressing force, at A range, the disc spring 1'b having strong pressing force works, accordingly a large pressing force from the spring means 1' is provided in addition to the axial force of the regulating cam mechanism 34. Furthermore the more the shifting rates becomes small, the more the pressing force decreases with comparatively sharp decline. At a certain shifting range, the disc spring 1'b reaches its natural length. At B range, the belt pressing force is a combination of the coil spring 1'chaving comparatively weak force and the axial force of the regulating cam mechanism 34, and the more the shifting ration becomes small, the more the belt pressing force decreases with comparatively moderate decline.

FEASIBILITY OF THE INDUSTRY

As has been explained, the belt driven continuously variable transmission having a spring means, whose pressing force to hold the belt decreases as the shifting ratio becomes smaller, can be feasible in any power transmission for transportation uses and industrial uses, especially in automatic continuously variable transmissions mounted in automobiles.

We claim:

1. A belt driven continuously variable transmission comprising:
   primary and secondary pulleys both of which have two relatively slidable sheaves being supported on shafts,
   a pressure regulating mechanism for transmitting an axial force in accordance with the transmission torque to at least one of said pulleys,
   actuator mechanisms for axially moving the movable sheaves of both pulleys,
   a belt wound around both pulleys, and spring means for biasing together the sheaves of at least one of said pulleys with a force which is reduced as the shifting ratio is reduced.

2. A belt driven continuously variable transmission defined in claim 1, wherein said spring means works only within the range of high shifting ratio.

3. A belt driven continuously variable transmission as defined in claim 2, wherein said spring means is a plurality of multiple disc springs.

4. A belt driven continuously variable transmission as defined in claim 1, wherein said spring means includes plural springs which respectively have different biasing forces and natural lengths.

5. A belt driven continuously variable transmission as defined in claim 4, wherein said spring means is a combination of at least one disc spring.

6. A belt driven continuously variable transmission as defined in claim 1, wherein said belt driven continuously variable transmission which is used for an automatic continuous variable transmission connects a secondary shaft of said belt driven continuously variable transmission to a first rotating element of a planetary gear device; connects a second rotating element of said planetary gear device, through a clutch, to an input shaft transmitting power to a primary shaft of said continuously variable transmission; and connects a third rotating element of said planetary gear device to an output section; whereby power transmission is conducted exclusively through said belt driven continuously variable transmission under the condition that said planetary gear device works as a reduction mechanism by releasing said clutch and restraining said second rotating element; and whereby, by engaging said clutch, said planetary gear mechanism works as a split drive mechanism to combine torque transmitted through said belt driven continuously variable transmission and torque transmitted from said input shaft to said second rotating element.

* * * * *

UNITED STATES PATENT AND TRADEMARK OFFICE
CERTIFICATE OF CORRECTION

PATENT NO. : 5,094,652
DATED : March 10, 1992
INVENTOR(S) : SAKAKIBARA et al

It is certified that error appears in the above-identified patent and that said Letters Patent is hereby corrected as shown below:

Col. 1, line 12, after "automobile" insert a period --.-- and delete "more" insert --More--;

line 32, after "decreases" insert --for--;

line 55, delete "34+" insert --34'--.

Col. 3, line 40, after "vs." insert --shifting--.

Col. 5, line 13, delete "axis" insert --shaft--;

line 14, delete "shaft" insert --axis--;

line 20, delete "plane-tary" insert --planetary--.

Col. 6, line 16, after "side" insert --contacts a--.
    line 16, delete "control"

Col. 7, line 22 delete "be-comes" insert --becomes--;

line 54, delete "run" insert --runs--.

UNITED STATES PATENT AND TRADEMARK OFFICE
CERTIFICATE OF CORRECTION

PATENT NO. : 5,094,652
DATED : March 10, 1992
INVENTOR(S) : SAKAKIBARA et al

It is certified that error appears in the above-identified patent and that said Letters Patent is hereby corrected as shown below:

Col. 8, line 20, delete "sections" insert --section--;

line 19, delete "which is" insert --to which--;

line 45, delete "103 with the" insert --102 has a--;

line 53, delete "fixing to in" insert --fixed to--.

Col. 9, line 23, delete "raing" insert --aring--.

Col. 11, line 8, after "retainer" insert --1a disengage--;

line 17, delete "increased" insert --increases--.

Col. 12, line 7, after "and" delete the comma ",";

line 40, delete "1;3b" insert --1'b--;

line 51, delete "under" insert --span--;

line 60, delete "rates" insert --ratio--;

line 64, delete "1'chaving" insert --1'c having--;

line 66, delete "ration" insert --ratio--.

UNITED STATES PATENT AND TRADEMARK OFFICE
CERTIFICATE OF CORRECTION

PATENT NO. : 5,094,652
DATED : March 10, 1992
INVENTOR(S) : SAKAKIBARA et al

It is certified that error appears in the above-identified patent and that said Letters Patent is hereby corrected as shown below:

IN THE CLAIMS:

Col. 13, line 26, before "defined" insert --as--.

Col. 14, line 7, after "spring" insert --and one coil spring--.

Signed and Sealed this

Twenty-fourth Day of August, 1993

Attest:

BRUCE LEHMAN

Attesting Officer

Commissioner of Patents and Trademarks